United States Patent [19]
Satoh et al.

[11] Patent Number: 5,303,225
[45] Date of Patent: Apr. 12, 1994

[54] MULTI-LAYERED OPTICAL DISK WITH TRACK AND LAYER IDENTIFICATION

[75] Inventors: Isao Satoh, Neyagawa; Yoshihisa Fukushima, Osaka; Yuji Takagi, Kadoma; Yasushi Azumatani, Neyagawa; Hiroshi Hamasaka, Nishinomiya, all of Japan

[73] Assignee: Matshushita Electrical Industrial Co., Ltd., Osaka, Japan

[21] Appl. No.: 595,422

[22] Filed: Oct. 11, 1990

[30] Foreign Application Priority Data

Oct. 30, 1989 [JP] Japan .................. 1-283241

[51] Int. Cl.⁵ .................. G11B 7/24; G11B 23/40; G11B 23/42
[52] U.S. Cl. .................. 369/275.3; 369/275.1
[58] Field of Search .................. 369/275.1-275.5, 369/108, 94, 95, 109, 13, 116; 360/114, 59; 365/127

[56] References Cited

U.S. PATENT DOCUMENTS

| 4,219,704 | 8/1980 | Russell | 365/127 |
| 4,451,915 | 5/1984 | LaBudde et al. | 369/275.3 |
| 4,535,439 | 8/1985 | Satoh et al. | 369/275.4 |
| 4,612,587 | 9/1986 | Kaneko et al. | 360/114 |
| 4,688,203 | 8/1987 | Koishi et al. | 369/116 |
| 4,956,243 | 9/1990 | Miyake et al. | 369/288 |
| 5,051,970 | 9/1991 | Ishii et al. | 360/59 |

FOREIGN PATENT DOCUMENTS

| 0092707 | 7/1983 | European Pat. Off. | |
| 3827738A1 | 3/1989 | Fed. Rep. of Germany | |
| 59-36347 | 2/1984 | Japan | 369/14 |
| 59-72682 | 4/1984 | Japan | 369/13 |
| 59-81671 | 5/1984 | Japan | 360/114 |
| 61-243974 | 10/1986 | Japan | 360/114 |
| 62-26680 | 2/1987 | Japan | 369/13 |
| 63-108539 | 5/1988 | Japan | 360/114 |

OTHER PUBLICATIONS

Koshino et al, "Optical Method of the Head Positioning in Magnetic Disk Systems", IEEE Transactions on Magnetics vol. MAG. 16, No. 5 (Sep. 1980) pp. 631–633.

Japanese Laid-Open Patent Application No. 63-50918, abstract.

Primary Examiner—Hoa T. Nguyen
Attorney, Agent, or Firm—Price, Gess, & Ubell

[57] ABSTRACT

A multi-layered optical disk comprising a plurality of recording layers accumulated in the thickness direction wherein a light beam is focused on one of tracks of one of the layers thereby to record and reproduce data, the optical disk being characterized in that recording layers each have an identification section storing an address of the recording layer which the identification section belongs to.

14 Claims, 5 Drawing Sheets

MULTI-LAYERED OPTICAL DISK WITH TRACK AND LAYER IDENTIFICATION

BACKGROUND OF THE INVENTION (1) Field of the Invention

This invention relates to an optical disk used for data recording and reproduction, especially to a multi-layered optical disk having multiple recording layers.

(2) Description of the Prior Art

In recent years, this type of optical disks have been developed actively due to the large memory capacity and high access speed. An optical disk shown in FIG. 1 has been proposed in order to further increase the memory capacity.

This optical disk 12 comprises three recording layers 8a through 8c formed of a photochromic material such as spyropyrene, the layers being interposed between a pair of bases 13. The recording layers 8a through 8c have sensitivity peaks in wavelengths $\lambda_1$ through $\lambda_3$ (FIG. 2), respectively while allowing lights having the other wavelengths to transmit therethrough.

Data recording and reproduction is done in the following way. A light is emitted from a light source 9, such as a laser, which can vary wavelengths, and it is focused into an extra fine light beam by a focusing optical system 10, thereafter the light is illuminated on the disk 12. The light is transmitted through the recording layers 8a, 8b and 8c and is detected by a light detector 11 provided on the other side from the light source 9.

Data recording will be described in more detail. If the light emitted from the light source 9 and illuminated on the disk 12 has a wavelength $\lambda_2$, it is transmitted through the recording layers 8a and 8c but is absorbed into the recording layer 8b, whereby data is recorded in the layer 8b.

For data reproduction, only the data recorded in the layer 8b can be retrieved by illuminating a light of $\lambda_2$.

As apparent from the above, memory capacity is increased by providing more recording layers.

However, providing more recording layers enlarges the total thickness of the recording layers. In order to record and reproduce data in such a thick disk only by use of wavelength difference without detecting exact positions of the layers, the light beam should have quite a large diameter, which prevents high density recording.

Also, the large light beam diameter causes crosstalks between neighboring tracks.

SUMMARY OF THE INVENTION

Accordingly, the present invention has an object of offering a multi-layered optical disk which detects an exact position of each recording layer for minimizing the diameter of the light beam and thus remarkably enhancing the recording density.

This invention has another object of offering a multi-layered optical disk which prevents crosstalks between neighboring tracks and layers.

The above objects are fulfilled by a multi-layered optical disk comprising a plurality of recording layers accumulated in the thickness direction wherein a light beam is focused on one of the tracks of one of the layers thereby to record and reproduce data, the optical disk being characterized in that recording layers each have an identification section storing an address of the recording layer which the identification section belongs to.

The identification section may store an address of the track which the identification section belongs to.

The tracks of two of the layers neighboring in the thickness direction may be shifted against each other in the radial direction by half of a track pitch.

The optical disk may have two recording layers.

The tracks each may comprise a plurality of sectors.

The sectors each may have an identification section, which stores addresses of the recording layer, the track and the sector which the identification section belongs to.

The identification sections may be shifted against one another in the tracking direction.

The above objects are also fulfilled by a multi-layered optical disk comprising a plurality of recording layers each having a plurality of tracks, wherein the layers are accumulated in the way that the tracks are aligned in the thickness direction; the optical disk being characterized in that at least one of the recording layers has a first identification section storing an address of the tracks which are aligned in the thickness direction and one of which has the first identification section; and that the recording layers each have a second identification section storing an address of the recording layer which the second identification section belongs to.

The first identification section may have a long enough a pit to allow a recorded data to be reproduced if the light beam is focused on either one of the recording layers while the second identification section has a short enough a pit to allow the recorded data to be reproduced if the light beam is focused on the layer specified.

The tracks each may comprise a plurality of sectors, each of which has its address stored in the first identification section.

The above objects are also fulfilled by a multi-layered optical disk comprising a plurality of recording layers each having a plurality of tracks, wherein the layers are accumulated in the way that the tracks are aligned in the thickness direction; the optical disk being characterized in that at least one of the recording layers has a first identification section storing an address of the tracks which are aligned in the thickness direction and one of which has the first identification section; and that the recording layers each have a second identification section storing an address of the recording layer which the second identification section belongs to, the second identification sections being shifted against one another in the tracking direction.

In the above construction, since each layer of the optical disk has its own address stored in the identification section thereof, the exact position of the desired recording layer is easily found. As a result, the diameter of the light beam can be minimized, realizing high density recording.

Moreover, when the identification sections of the layers neighboring in the thickness direction are provided so that the light beam may not be focused on two or more of the sections simultaneously, crosstalks between neighboring identification sections can be substantially prohibited. Therefore, the desired identification section, namely, the desired recording layer, can be accurately detected.

In conclusion, the above construction provides high precision, high density recording on multiple layers of an optical disk.

BRIEF DESCRIPTION OF THE DRAWINGS

These and other objects, advantages and features of the invention will become apparent form the following description thereof taken in conjunction with the accompanying drawings which illustrate specific embodiments of the invention. In the drawings.

DESCRIPTION OF THE PREFERRED EMBODIMENTS

Embodiment I

A first embodiment of this invention will be described referring to FIGS. 3 through 5.

Figure 1:
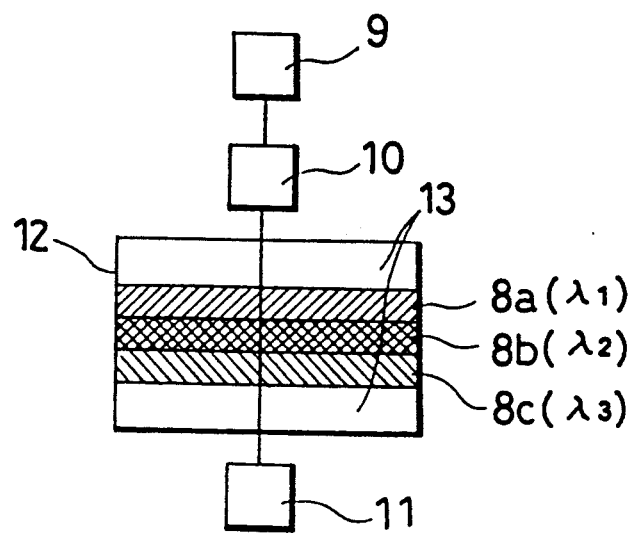
FIG. 1 is a view showing a construction of a conventional multi-layered optical disk along with a data recording and reproduction apparatus.
Figure 2:
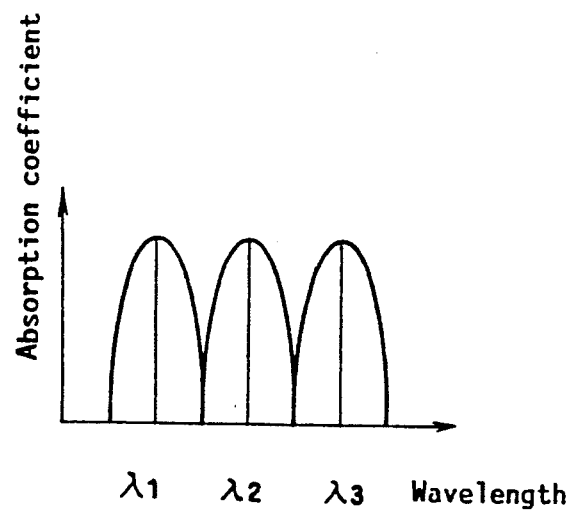
FIG. 2 is a view showing a wavelength spectrum recorded on the above optical disk.
Figure 3:
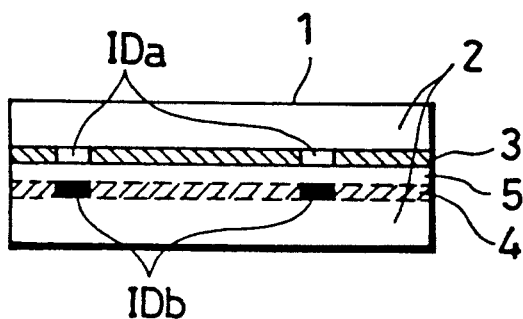
FIG. 3 is a vertical cross sectional view of a multi-layered optical disk as a first embodiment of this invention.

As shown in FIG. 3, a multi-layered optical disk 1 comprises upper and lower base plates 2 opposed to each other, a first recording layer 3 superposed on a lower surface of the upper base plate 2, a second recording layer 4 superposed on an upper surface of the lower base plate 2 and a spacer 5 made of UV resin for prohibiting the recording layers 3 and 4 from contacting each other. The layers 3 and 4 have known pit constructions.

Figure 4:
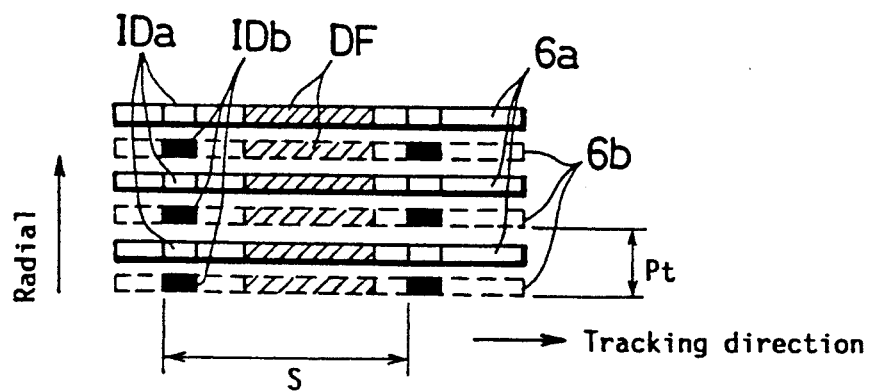
FIG. 4 is a plan view of the optical disk of FIG. 3.
Figure 5:
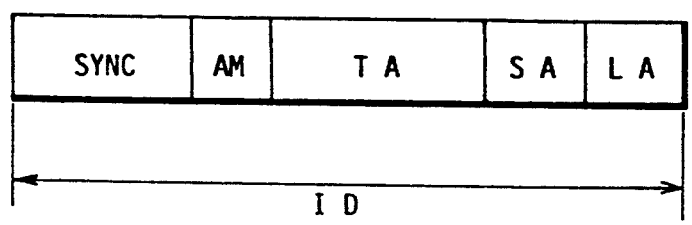
FIG. 5 is a view showing a construction of an identification section of the optical disk of FIG. 3.

As shown in FIG. 4, the recording layers 3 and 4 comprise a plurality of concentric tracks 6a and 6b, respectively (the tracks are shown in parallel for convenience in FIG. 4). The tracks 6a and 6b are shifted against each other in the radial direction by half of a track pitch Pt. Each track is divided into a plurality of sectors S, each of which has an identification section (referred to as $ID_a$ for the track 6a and as $ID_b$ for the track 6b) and a data field DF for storing data. As shown in FIG. 5, each identification section $ID_a$ or IDb comprises a section SYNC for synchronizing clocks, an address mark AM indicating a start of an address signal, a track address TA, a sector address SA and a recording layer address LA.

The multi-layered optical disk 1 is produced by forming the recording layers 3 and 4 on the base plates 2 having projecting portions and then adhering the base plates 2 with an adhesive made of UV resin (the adhesive is solidified into the spacer 5). The spacer 5 is desirably as thin as possible but a thickness of 10 to 100 μm is acceptable. The projecting portions allow the layers 3 and 4 each to have the known pit construction.

A data is recorded in the multi-layered optical disk 1 in the following way. First, a desired recording layer 3 or 4 is retrieved by reproducing the recording layer addresses LA of the disk 1. Second, a desired track 6a or 6b is retrieved by reproducing the track addresses TA of the retrieved layer. Third, a desired sector S is retrieved by reproducing the sector addresses SA of the retrieved track. Finally, a data is recorded in the data field DF of the retrieved sector S.

If a layer whose address is reproduced is not the desired one in the above first retrieval, the following operation is carried out to retrieve the desired one. The light beam is defocused and illuminated on the disk 1 while changing the position of the focus. Each time the light beam is transmitted through the layers 3 or 4, an S curve is formed to indicate a focusing error. The zero cross point of each S curve is detected until the same number of zero cross points as the ordinal number of the desired layer is detected. The ordinary number is determined as follows: when the layer 4 is the reference layer, the layer 4 is the first layer and the layer 3 is the second layer. When the above number of zero cross points are detected, namely, when the desired layer is retrieved, the light beam is focused again and the identification section $ID_a$ or $ID_b$ is read out for confirming that the desired layer is retrieved.

The desired track $TA_1$ is retrieved in the following manner. When a track address $TA_2$ is reproduced, the position of $TA_2$ is compared with the position of the desired track address $TA_1$, and the head of the light beam is moved by a linear motor until it reaches the desired track address $TA_1$ (rough retrieval). If the desired track address $TA_1$ is confirmed, the operation advances to the next step of retrieving the desired sector S. If not, all the track addresses $TA_2$ are reproduced one by one by the tracking actuator until the head reaches the desired track address $TA_1$ (fine retrieval).

The desired sector S is retrieved by comparing the desired sector address $SA_1$ and a read address and by rotating the optical disk 1 until the head reaches the desired sector address $SA_1$.

Data reproduction is done in the same manner as data recording.

Since the recording layers 3 and 4 comprise identification sections $ID_a$ and $ID_b$, respectively, having the recording layer addresses LA in this embodiment, whichever layer the light beam is focused and tracking on can be accurately detected. Even if the number of recording layers are increased to enlarge the total thickness of the layers, highly precise recording and reproduction is realized with high density. Providing a track address TA in each identification section allows easy confirmation of the desired track.

Moreover, the tracks 6a and 6b are shifted against each other in the radial direction by half of the track pitch Pt. Practically speaking, therefore, the light beam is never illuminated on the adjacent recording layer, greatly preventing crosstalks between neighboring identification sections and between neighboring data fields.

Embodiment II

Figure 6:
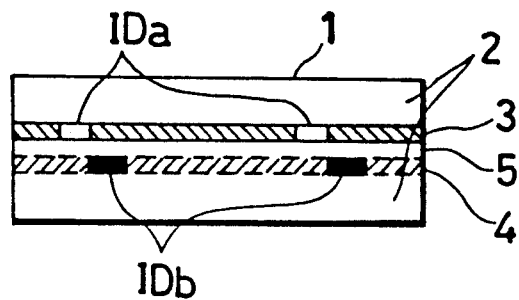
FIG. 6 is a vertical cross sectional view of a multi-layered optical disk as a second embodiment of this invention.
Figure 7:
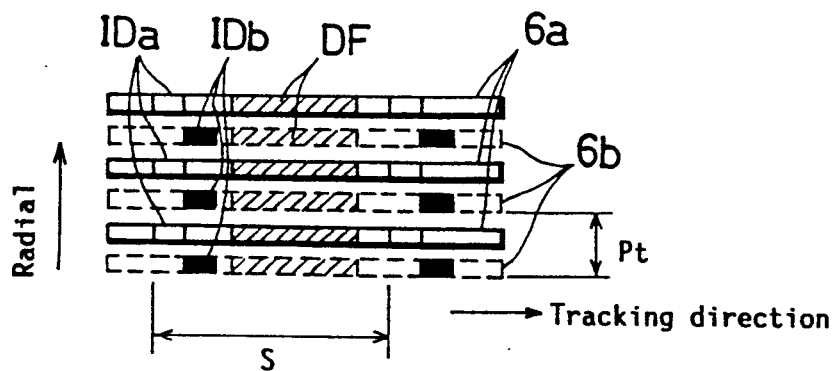
FIG. 7 is a plan view of the optical disk of FIG. 6.

The second embodiment of this invention will be described referring to FIGS. 6 and 7. The same elements share the same numerals with Embodiment I and their explanation will be omitted.

This embodiment is distinct from Embodiment I in that the identification sections $ID_a$ and $ID_b$ are shifted relative to each other in the tracking direction. Desirably, the identifications $ID_a$ and $ID_b$ are not overlapped when seen in the radial direction.

In addition to the advantages of Embodiment I, this construction further prevents the light beam from illuminating neighboring identification sections simultaneously and thus further restricting crosstalks.

Embodiment III

A third embodiment of this invention will be described referring to FIGS. 8 and 9.

Figure 8:
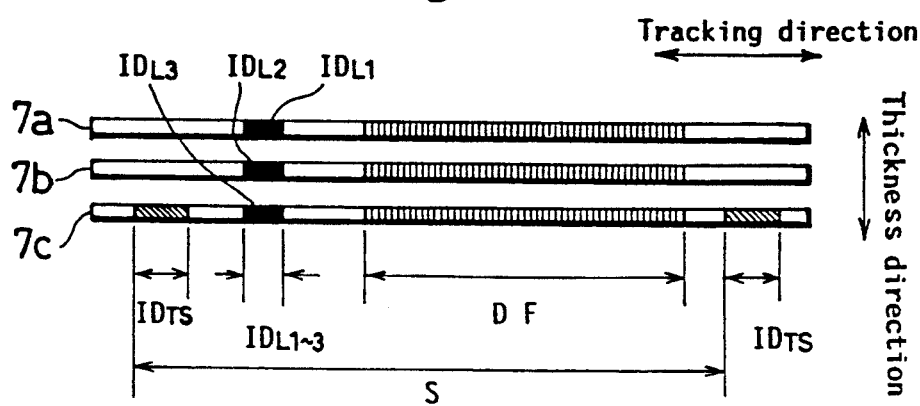
FIG. 8 is a vertical cross sectional view of a multi-layered optical disk as a third embodiment of this invention.

As shown in FIG. 8, the optical disk 1 comprises three recording layers 7a through 7c. The layers 7a through 7c have identification sections $ID_{L1}$, $ID_{L2}$ and $ID_{L3}$, respectively. The layer 7c also has track/sector identification sections $ID_{TS}$, by which tracks and sectors are identified. The tracks of the layers 7a through 7c are not shifted but are aligned in the thickness direction. Each track/sector identification section $ID_{TS}$ identifies a group of tracks and sectors which are aligned in the thickness direction. The layers 7a through 7c each have the known pit construction.

Figure 9:
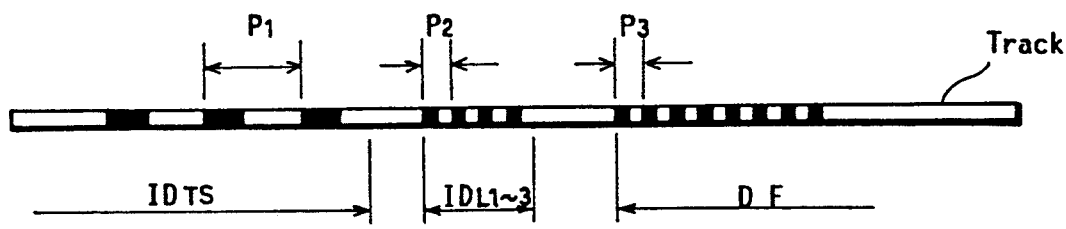
FIG. 9 is an enlarged view of one track of FIG. 8.

As shown in FIG. 9, the track/sector identification section $ID_{TS}$ has a pit pitch $P_1$, the identification sections $ID_{L1}$, $ID_{L2}$ and $ID_{L3}$ each have a set pitch $P_2$, and the data field DF has a pit pitch $P_3$, the pit pitches having the relationship $P_1 > P_2 = P_3$. Practically, $P_1$ is set so that the recorded data may be reproduced well enough if the light beam is focused on either one of the layers 7a, 7b and 7c (for example, $P_1$ is 5 $\mu$m or less). $P_2$ and $P_3$ are set so that the recorded data is reproduced well enough when the light beam is focused on the specified layer 7a, 7b or 7c (for example, $P_2$ and $P_3$ are each 0.8 $\mu$m). In other words, the track/sector identification section $ID_{TS}$ can be read out if only the light beam is focused on either one of the layers while the identification sections $ID_{L1}$, $ID_{L2}$ and $ID_{L3}$ can be read out if the light beam is focused on the specified layer.

How to access each layer, for example, the recording layer 7a, will be described hereinafter. In this embodiment, the layer 7c is the reference layer and the ordinal number of the layer 7a is known.

A light beam is focused on the layer 7c when a specified number of zero cross points of the S curves as focusing error signals are detected, and the identification section $ID_{L3}$ is read out to confirm that the light beam is focused on the layer 7c. Then, when a certain number of zero cross points are detected, the light beam is focused on the layer 7a. The certain number is obtained by subtracting one from the ordinal number of the layer 7a. The identification section $ID_{L1}$ is detected to confirm that the light beam is focused on the layer 7a. Thereafter, the track/sector identification sections $ID_{TS}$ are detected one by one until the desired track and then the desired sector are retrieved.

In the above construction, no other signal is recorded in any portion of the layers 7a and 7b, the portion being perpendicularly opposed to the track/sector identification section $ID_{TS}$; and the identification sections $ID_{L1}$, $ID_{L2}$ and $ID_{L3}$ have too small pit pitches to read out unless the light beam is focused on the desired layer. Therefore, this embodiment greatly prevents crosstalks in addition to having the advantages of Embodiment I. Moreover, since the tracks of different layers are not required to be shifted against one another by half the track pitch, productivity of the optical disks is increased.

Embodiment IV

Figure 10:
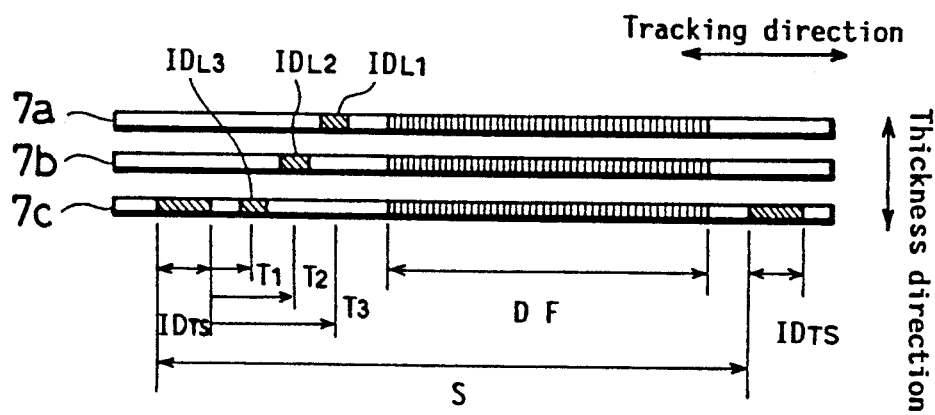
FIG. 10 is a vertical cross sectional view of a multi-layered optical disk as a fourth embodiment of this invention.

A fourth embodiment of this invention will be described referring to FIG. 10. The same elements share the same numerals with Embodiment III and their explanation will be omitted.

This embodiment is distinct from Embodiment III in that the identification sections $ID_{L1}$, $ID_{L2}$ and $ID_{L3}$ are also shifted relative to one another in the tracking direction. Practically, the identification sections $ID_{L1}$, $ID_{L2}$ and $ID_{L3}$ are off from the track/sector identification section $ID_{TS}$ by distances $T_1$, $T_2$ and $T_3$, respectively. Desirably, $T_1$ minus $T_2$ or $T_2$ minus $T_3$ is the same or larger than a length of $ID_{L1}$, $ID_{L2}$ and $ID_{L3}$ each in the tracking direction. Since the identification sections $ID_{L1}$, $ID_{L2}$ and $ID_{L3}$ have the same pit constructions as those of Embodiment III, the track/sector identification section $ID_{TS}$ can be read out if only the light beam is focused on either one of the layers while the identification sections $ID_{L1}$, $ID_{L2}$ and $ID_{L3}$ can be read out if the light beam is focused on the specified layer. The layer 7a can be accessed in the same manner in Embodiment III.

In this embodiment, since the identification sections $ID_{L1}$, $ID_{L2}$ and $ID_{L3}$ are shifted against one another in the tracking direction, the light beam is prevented from illuminating neighboring identification sections simultaneously. As a result, this embodiment further restricts crosstalks in addition to having the advantages of Embodiment III.

Although the tracks comprise sectors in the above four embodiments, data may be recorded all along the tracks.

In the above embodiments, the recording layers have sensitivity peaks in different wavelengths. However, the disk may comprise layers formed of an usual opto-magnetic material such as TbFeCo or a phase change material such as GeSbTe.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A multi-layered optical disk formatted to increase the density of information that can be read by a relatively small light beam when focused on a specific layer, comprising:

a base plate;

a plurality of recording layers progressively stacked above the base plate;

a spacing layer positioned between recording layers to segregate adjacent recording layers; and a plurality of tracks positioned on each recording layer at a predetermined track pitch, the track pitch being the distance between adjacent tracks in the same recording layer, the respective tracks extending approximately transverse to a radial direction of the disk, all of the tracks on each adjacent recording layer being shifted in radial pitch in the radial direction from the tracks on another adjacent recording layer, wherein each track includes an identification section having a specific area on which to record a recording layer address, LA, of the layer on which the track is positioned.

2. The multi-layered optical disk of claim 1 wherein each identification section further comprises a section, SYNC, for synchronizing clocks, an address mark, AM, for indicating a start of an address signal, a track address, TA, and a sector address, SA, to define each sector of a track, and the shift in radial pitch is one-half of the track pitch.

3. A multi-layered optical disk formatted to increase the density of information that can be read by a relatively small light beam of a single predetermined wavelength when focused on a specific layer, comprising:
   a base plate;
   a plurality of recording layers progressively stacked above the base plate;
   a spacing layer positioned between recording layers to segregate adjacent recording layers; and
   a plurality of tracks positioned on each recording layer at a predetermined track pitch, the track pitch being the distance between adjacent tracks in the same recording layer, each track including an identification section having a specific area on which to record a recording layer address, LA, of the layer on which the track is positioned, the respective tracks extending approximately transverse to a radial direction of the disk, all of the tracks on each adjacent recording layer being shifted in radial pitch in the radial direction from another adjacent recording layer so that each respective track on one recording layer is offset from each respective track on the other adjacent recording layer in the stacked direction of the optical disk.

4. The multi-layered optical disk of claim 3 wherein each identification section further comprises a section, SYNC, for synchronizing clocks, an address mark, AM, for indicating a start of an address signal, a track address, TA, and a sector address, SA, to define each sector of a track.

5. The multi-layered optical disk of claim 3 wherein the shift in radial pitch is one-half of the track pitch.

6. A multi-layered optical disk capable of being used by focusing a light beam on individual layers comprising:
   a first recording layer;
   a second recording layer, spaced from and positioned below the first recording layer;
   a third recording layer, spaced from and positioned below the second recording layer;
   a spacer material, transparent to the light beam, positioned between the first, second, and third recording layers;
   a plurality of tracks provided in each of the recording layers, the tracks extending approximately transverse to a radial direction of the disk, each track being divided into a plurality of sectors; and
   a plurality of identification sections provided in one of the sectors of each track, each identification section holding an address for discriminating one recording layer to which the identification section belongs from the other layer, the address being able to be read by the light beam which is in the state of being focused on the sector.

7. The multi-layered optical disk of claim 6 wherein the respective tracks for each layer are radially shifted from the tracks in an adjacent layer by one-half of a track pitch, the track pitch being the distance between adjacent tracks in the same layer.

8. The multi-layered optical disk of claim 6 wherein the spacer layer has a thickness in the range of 10 to 100 $\mu$m 9. The multi-layered optical disk of claim 6, wherein each identification section includes another area to record an address of the track to which the section belongs.

10. The multi-layered optical disk of claim 6, wherein each sector has an identification section, which includes other areas to record addresses of the track and the sector to which the section belongs.

11. The multi-layered optical disk of claim 6, wherein one of the recording layers has a first identification section and each track comprises a plurality of sectors, each of which has its address recorded in the first identification section.

12. The multi-layered optical disk of claim 6 wherein each identification section further comprises a section, SYNC, for synchronizing clocks, an address mark, AM, for indicating a start of an address signal, a track address, TA, and a sector address, SA, to define each sector of a track.

13. The multi-layered optical disk of claim 6 wherein each of the plurality of tracks is positioned at a predetermined track pitch, the track pitch being the distance between adjacent tracks in the same recording layer, the respective radial pitch between adjacent recording layers being shifted.

14. The multi-layered optical disk of claim 13 wherein the shift in radial pitch is one-half of the track pitch.

* * * * *